United States Patent
Ewert

(10) Patent No.: US 10,572,243 B2
(45) Date of Patent: Feb. 25, 2020

(54) METHOD AND SYSTEM FOR UPDATING THE SOFTWARE OF A MOTOR VEHICLE SENSOR

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/099,281

(22) PCT Filed: Mar. 6, 2017

(86) PCT No.: PCT/EP2017/055148
§ 371 (c)(1),
(2) Date: Nov. 6, 2018

(87) PCT Pub. No.: WO2017/190868
PCT Pub. Date: Nov. 9, 2017

(65) Prior Publication Data
US 2019/0196806 A1    Jun. 27, 2019

(30) Foreign Application Priority Data
May 6, 2016    (DE) .......... 10 2016 207 836

(51) Int. Cl.
*G06F 9/445*    (2018.01)
*G06F 8/65*    (2018.01)
*G06F 8/654*    (2018.01)
*B60R 16/023*    (2006.01)

(52) U.S. Cl.
CPC .............. *G06F 8/65* (2013.01); *B60R 16/023* (2013.01); *G06F 8/654* (2018.02)

(58) Field of Classification Search
CPC ..... G06F 8/67; G06F 8/60; G06F 8/65; G06F 8/61; H04L 29/08981
See application file for complete search history.

(56) References Cited

U.S. PATENT DOCUMENTS

| | | |
|---|---|---|
| 2005/0216903 A1 | 9/2005 | Schaefer |
| 2007/0100513 A1 | 5/2007 | Asano |
| 2008/0140278 A1 | 6/2008 | Breed |
| 2013/0219039 A1* | 8/2013 | Ricci .................. H04L 43/0876 709/223 |
| 2015/0220321 A1 | 8/2015 | Jung |
| 2015/0242198 A1 | 8/2015 | Tobolski et al. |
| 2018/0078843 A1* | 3/2018 | Tran ..................... G16H 40/63 |

FOREIGN PATENT DOCUMENTS

DE    102010028832 A1    11/2011

OTHER PUBLICATIONS

International Search Report for PCT/EP2017/055148, dated May 18, 2017.

* cited by examiner

*Primary Examiner* — Chuck O Kendall
(74) *Attorney, Agent, or Firm* — Norton Rose Fulbright US LLP; Gerard Messina

(57) ABSTRACT

A method for updating software of at least one sensor in a motor vehicle, which is equipped with a motor vehicle communication system, comprises transmitting the software to be updated to the motor vehicle communication system and to install it from the motor vehicle communication system on the at least one sensor.

20 Claims, 1 Drawing Sheet

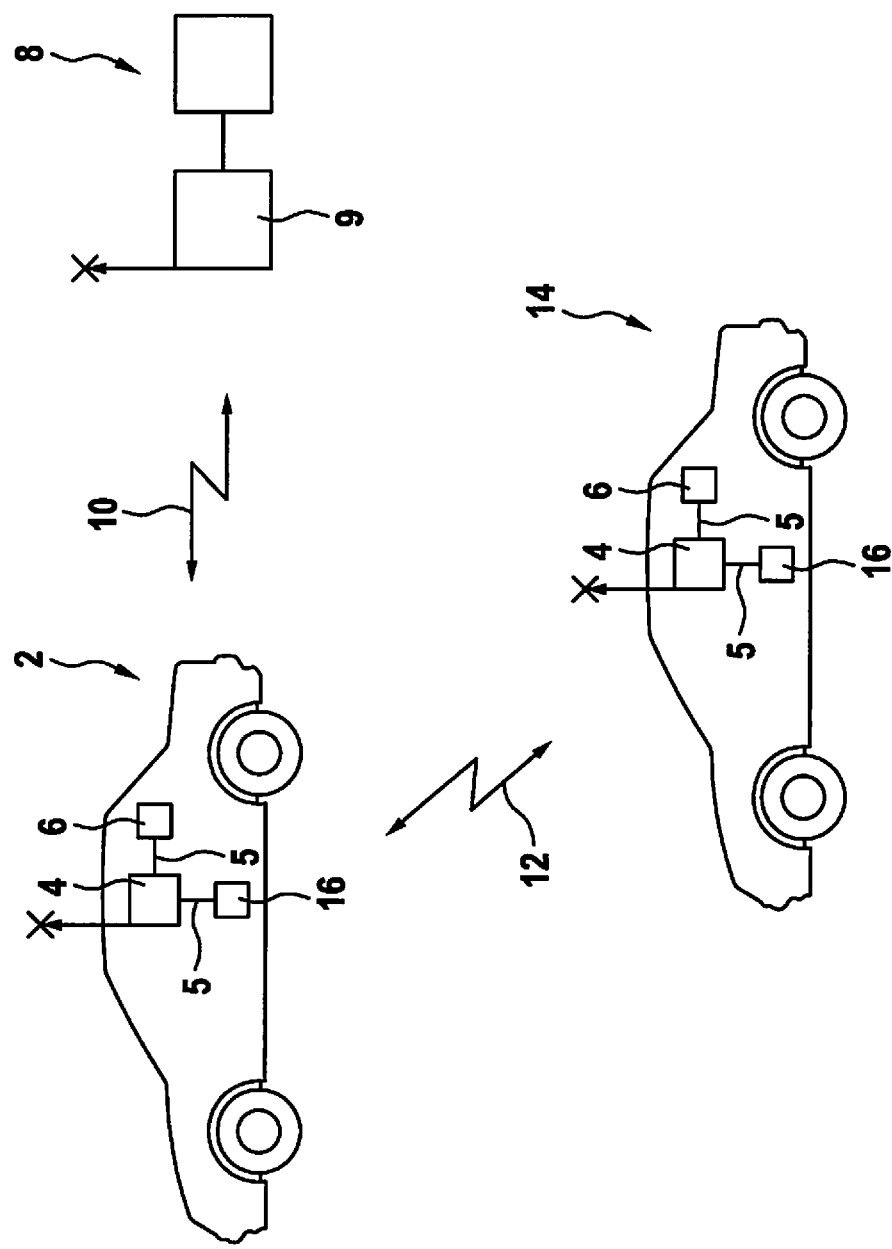

METHOD AND SYSTEM FOR UPDATING THE SOFTWARE OF A MOTOR VEHICLE SENSOR

FIELD OF THE INVENTION

The present invention relates to a method and a system for updating the software of a sensor in a motor vehicle.

BACKGROUND INFORMATION

In current motor vehicles, a multitude of sensors are used, for example acceleration and pressure sensors for detecting accidents and surround sensors designed to detect the surroundings of the motor vehicle.

Such sensors, or their sensor control units, normally comprise microprocessors or discrete circuits on which a program (software) runs. The software in the sensors or in their sensor control units must be updated from time to time in order to remove errors and/or to improve the performance of the sensors.

In order to update the software in the sensors, it is hitherto necessary for the motor vehicle to be brought to a shop, where the new software is installed on the sensors, or, in case of a fault, the sensors must even be exchanged because there exists for example no possibility of a software update in the sensor. This is laborious and expensive and there is the risk that the motor vehicle is traveling for an extended period with outdated and/or faulty software and/or a defective sensor before it is brought into the shop.

It is therefore desirable to simplify and accelerate updating the software of sensors that are installed in motor vehicles.

SUMMARY

According to one exemplary embodiment of the present invention, a method for updating the software of at least one sensor in a motor vehicle, which is equipped with a motor vehicle communication system, comprises transmitting the software to be updated to the motor vehicle communication system and to install it from the motor vehicle communication system on the at least one sensor.

According to one exemplary embodiment of the present invention, a system for updating the software of a sensor installed in a motor vehicle comprises a motor vehicle communication system installed in the motor vehicle, which is designed to receive the software to be updated and to install it on the at least one sensor.

Installing software on a sensor comprises in particular transferring the software to an external control unit of the sensor and/or a control device that exists in the sensor itself and installing it there.

The data transmitted to the motor vehicle communication system may comprise in particular the serial number of the sensor, the software version currently existing on the sensor and/or the (IP) address of the respective motor vehicle communication system.

In this manner it is possible to update the software on the sensors of the motor vehicles quickly, simply and reliably, without having to take the vehicle to a shop for this purpose. Another possible achievement is that the sensors of the motor vehicle are always equipped with the up-to-date software. Risks resulting from the use of outdated/faulty software may be reduced considerably.

One specific embodiment comprises transmitting the software to be updated to the motor vehicle communication system via a radio connection. The radio connection may comprise in particular the Internet (e.g. LAN, WLAN), a mobile telephony network (e.g. GSM, UTMS, LTE), a radio broadcasting network (e.g. VHF, DRS) or a system for near field communication (NFC) such as e.g. Bluetooth®. In this manner, it is possible to transmit the software conveniently and securely to the motor vehicle communication system.

One specific embodiment comprises transmitting the software to be updated only to the motor vehicle communication systems of motor vehicles that are equipped with a sensor that requires a software update and for which the new software is suitable. In order to achieve this, it is possible to use a list that contains the serial numbers of the sensors to be updated. Another list may establish the connection between the sensors to be updated and the motor vehicles in which these sensors are installed. The lists are kept up-to-date with the sensor data of the sensors installed in all vehicles. The lists may be stored for example in a virtual cloud so that they are accessible from anywhere. This makes it possible to transmit the software only to motor vehicle communication systems of motor vehicles that are equipped with at least one corresponding sensor. An unnecessary data transmission to motor vehicles whose sensors do not require a software update may be avoided.

In one specific embodiment, the method comprises transmitting the software from a stationary infrastructure server to the motor vehicle communication system. The stationary server may have a defined (IP) address so that an update of the software is accepted only from servers having this address. The addresses of these authorized servers may be in particular stored in encrypted fashion in the sensor and/or in the motor vehicle communication system. Unauthorized software updates, for example by "hacker attacks", are thus rendered considerably more difficult.

In one specific embodiment, the method comprises transmitting the software from another motor vehicle to the motor vehicle communication system. Such a "car-to-car" data transmission makes it possible also to reach motor vehicles that are unable to establish a connection with a stationary server, e.g., because they are for a longer period in remote areas, in which no Internet/mobile telephony network is available.

If two motor vehicles encounter each other, where one of the motor vehicles has a newer software version than the other motor vehicle having the identical sensor, then the motor vehicles, which are located within a minimum distance that allows for a data transmission between the motor vehicle communication systems of the two motor vehicles, exchange data via a "car-to-car" communication interface. These data contain in particular the respective motor vehicle type, at least one sensor number, the current software version of the sensors installed in the respective motor vehicle and an (IP) address. The motor vehicle communication system of the motor vehicle having the newer software detects that the identical sensors of the other motor vehicle are equipped with outdated software and transmits the new software via the "car-to-car" communication interface to the motor vehicle communication system of the other motor vehicle. After the new software has been transmitted, is is installed ("flashed") on the respective sensor(s) of the other motor vehicle. As a result, the identical sensors of both motor vehicles are equipped with the new software.

In one specific embodiment, the method comprises transmitting the software to the motor vehicle communication system only at previously defined times. This makes it possible to prevent motor vehicles having different software versions from being on the road at the same time. Furthermore, this avoids or minimizes the risk of unauthorized access to the sensors ("hacking") since potential attackers must know the previously defined times of the update. The previously defined times for the update may be stored for example in an encrypted manner on the sensor, in particular during its manufacture, or in the motor vehicle communication system. The manufacturer of the sensor transmits his software updates only at one of the defined times. The sensors or the motor vehicle communication system check the time stamps of the data transmission and compare these with the previously stored times. Only if the software update was transmitted at one of the previously defined "correct" times, will it be installed on the sensors. It is possible that an intelligent algorithm calculates, for example for each day an update time, which differs from day to day, and stores this in the sensor/control unit or that it calculates it and stores it in the sensor/control unit already during manufacture.

As a further measure against unauthorized software updates, the software may be transmitted in an encrypted manner and/or together with a checksum. A checksum furthermore makes it possible to detect errors in the data transmission, which may result from unfavorable reception conditions, and to prevent such faultily transmitted software from being installed on the sensor and there causing a malfunction.

In one specific embodiment, the method comprises backing up the software located on the at least one sensor/control unit before installing new software on the at least one sensor/control unit. At least one software backup may be stored for later restoration on the or in the sensor/control unit. Optionally, the backup of the software may be deleted from the sensor once a new software has been copied successfully. Such a backed up software may be reactivated from the backup or may be copied over a newer software version. This may be initiated by the sensor manufacturer via the described data communication, if necessary.

In one specific embodiment, the method comprises installing the new software on the at least one sensor only when the motor vehicle is at a standstill or when the motor of the motor vehicle is at a standstill. Since the sensor is normally not active during the update of the software, safety problems that may arise from a temporary deactivation of the sensor during the software update are reliably avoided in this manner.

In one specific embodiment, the software is updated in ongoing driving operation. In this instance, the respective sensor is operated with the existing software until the next standstill of the motor vehicle. At the next standstill of the motor vehicle or after the next shutdown of the motor of the motor vehicle, the new software is activated after successful transmission, i.e., the sensor is "flashed" and started anew.

In one specific embodiment, the method comprises transmitting data concerning the sensor from the motor vehicle communication system to the stationary server. This makes it possible to communicate to the manufacturer of the sensor for example that an error has occurred and/or that the sensor is defective.

The sensor may also transmit its serial number to the manufacturer. This allows the manufacturer to identify the sensor and errors possibly occurring on/in the sensor with accuracy. Furthermore, the sensors having outdated software are thereby identified. In this manner, the manufacturer knows in particular precisely which motor vehicles are operated with a defective sensor or a sensor having outdated software. If it is a software error, it is subsequently possible in short order to install an updated software for the respective sensors via the described connection precisely in these motor vehicles without the motor vehicle having to be brought into a shop for this purpose.

In another specific embodiment of the present invention, a software update is performed on a sensor with the aid of a handshake mechanism between a server of the sensor manufacturer (infrastructure server) and the sensor or motor vehicle communication system in the motor vehicle or the motor vehicle communication systems of two motor vehicles that are equipped with the same sensor variant.

In another specific embodiment of the present invention, a software update is performed on a sensor with the aid of a push mechanism. The sensor is connected with the infrastructure server via the motor vehicle communication system and detects that a new software version exists for this sensor. The sensor subsequently downloads the new software automatically from the infrastructure server, as soon as it has the possibility to do so, and/or when it is not needed for a longer period, e.g., because the motor vehicle is at a standstill and/or the motor is shut down. The same push mechanism may also be used in "car-to-car" communication, in that the motor vehicle having the older software downloads and takes over the newer software from another motor vehicle via a push mechanism, as previously described.

In another specific embodiment, the motor vehicle is equipped with its own server. This server obtains the software updates for the sensors via a car-to-car and/or a car-to-infrastructure communication interface and distributes these then via another connection (e.g., LAN, LIN, CAN FlexRay, Ethernet, radio connection, etc.) within the motor vehicle to the respective sensors and/or sensor control units. After a transmission from the server to the sensors and/or sensor control units has occurred, the update is installed on the respective sensors and/or sensor control units with the aid of another connection between the sensor control unit and the sensor (e.g., PSI, SPI). Subsequently, the sensor acknowledges the successful update to the control unit and the sensor control unit acknowledges it to the server.

The server may be equipped in particular with its own version management. The advantage of a server situated in the motor vehicle is that the software updates do not necessarily have to be transmitted to a sensor during driving operation, but may be stored temporarily on the server. The transmission of the updates between the server and the sensor/sensor control unit may thus also occur offline, i.e., when there happens to be no communication connection.

In one specific embodiment, the user/driver of the motor vehicle is informed about the software update. For this purpose, a human-machine interface (HMI) such as a display is used for example.

In one specific embodiment, before a software update is performed on the sensor, a confirmation of the software update is requested from the driver via the HMI, for example a display or a smartphone. The update is performed only if the user/driver consents. In the case of a smartphone, it is possible to make use of the car-to-infrastructure communication connection or a similar radio connection.

BRIEF DESCRIPTION OF THE DRAWINGS

The FIGURE shows an exemplary embodiment of a system for updating the software of at least one sensor installed in a motor vehicle.

DETAILED DESCRIPTION

An exemplary embodiment of a system for updating the software of at least one sensor 6 installed in a motor vehicle 2, 14 is shown schematically in the FIGURE:

A motor vehicle 2, 14 comprises one or multiple sensors 6, one sensor 6 being shown in the FIGURE in each motor vehicle 2, 14, by way of example.

Sensors 6 are connected to a motor vehicle communication system 4 ("car-to-infrastructure communication system" and/or "car-to-car communication system"), as it is normally provided in modern motor vehicles 2, 14.

The local connections 5 between motor vehicle communication system 4 and sensors 6 may be wired or wireless. They may in particular comprise LAN, LIN, CAN, FlexRay, Ethernet and/or a radio connection such as e.g. Bluetooth®.

The system furthermore comprises a stationary server 8 ("infrastructure server") including a transmitting unit 9 that makes it possible to transmit data from stationary server 8 to motor vehicle communication system 4 via a data connection 10.

The data transmission may occur for example via the Internet (e.g. LAN, WLAN), a mobile telephony network (e.g. GSM, UTMS, LTE), a radio broadcasting network (e.g. VHF, DRS) near field communication (NFC) such as e.g. Bluetooth®.

After the data have been transmitted from the stationary server 8 to the motor vehicle communication system 4, they are transmitted by the latter via one of the local connections 5 to the respective sensor 6.

As an alternative or in addition to the data transmission from stationary server 8 to motor vehicle 2, 14, it is also possible for the data to be transmitted between two motor vehicles 2, 14, in which one of sensors 6 is already equipped with the updated software.

This is advantageous in particular if one motor vehicle 2, 14 having a sensor 6 that is not yet equipped with the updated software is located for a longer period outside of the range of transmitting unit 9 of server 8.

When such a vehicle 14 comes within the range of a vehicle 2 having identical sensors 6, which are already equipped with the updated software, then a data connection 12 may be established between motor vehicle communication systems 4 of the two vehicles 2, 14 in order to transmit the updated software between vehicles 2, 14.

The data connections 10, 12 between vehicles 2, 14, or between a vehicle 2, 14 and stationary server 8, may be established in particular by using a handshake mechanism and/or may use a push mechanism.

Transmitting unit 9 of stationary server 8 may also be designed as a receiving unit, which makes it possible to receive data from motor vehicle communication systems 4.

This makes it possible to transmit data concerning sensors 6 from motor vehicle communication systems 4 to stationary server 8. This makes it possible for example to communicate to the manufacturer that an error occurred in sensor 6 and/or that sensor 6 is defective and/or that sensor 6 is operated with outdated software.

It is also possible to transmit the serial number of sensor 6 to the manufacturer/stationary server 8. This allows the manufacturer accurately to identify sensor 6 and errors possibly occurring on/in sensor 6 and to assign these to a sensor. In this manner, the manufacturer knows in particular precisely which motor vehicles 2, 14 are operated with a defective sensor 6. If it is a software error, it is subsequently possible in short order to install an updated software for the respective sensors 6 via the described connection 10, 12 precisely in these motor vehicles 2, 14 without the motor vehicle 2, 14 having to be brought into a shop for this purpose.

In one exemplary embodiment, motor vehicles 2, 14 are respectively equipped with a separate server ("motor vehicle server") 16. Motor vehicle servers 16 obtain the software updates for the sensors 6 installed in the respective motor vehicle via a car-to-car and/or a car-to-infrastructure communication interface, as was described previously, and distribute the software then via a local connection 5, e.g., LAN, LIN, CAN FlexRay, Ethernet, radio connection, etc., within the motor vehicle 2, 14 to the respective sensors 6 and/or their sensor control units.

After the data have been transmitted from motor vehicle server 16 to sensors 6 or the sensor control units, the installation of the update on respective sensors 6 or sensor control units may be initiated with the aid of a further connection. Subsequently, sensor 3 may acknowledge the successful update to the control unit and the sensor control unit may acknowledge it to motor vehicle server 16. Motor vehicle server 16 is able to transmit this acknowledgment via data connection 10 onward to stationary server 8.

What is claimed is:

1. A method for updating software of at least one sensor in a first motor vehicle that is equipped with a motor vehicle communication system, comprising the steps:
    transmitting updated software of the at least one sensor to the motor vehicle communication system equipped in the first motor vehicle, wherein the transmitting of the updated software of the at least one sensor is performed by a second motor vehicle different from the first motor vehicle; and
    installing, on the at least one sensor in the first motor vehicle, the updated software of the at least one sensor from the motor vehicle communication system equipped in the first motor vehicle.

2. The method as recited in claim 1, wherein in the transmitting step, the updated software of the at least one sensor is transmitted by the second motor vehicle via a car-to-car communication connection.

3. The method as recited in claim 1, wherein in the transmitting step, the updated software of the at least one sensor is transmitted from the second motor vehicle to the motor vehicle communication system equipped in the first motor vehicle via a radio connection.

4. The method as recited in claim 1, wherein in the transmitting step, the updated software of the at least one sensor is transmitted only to motor vehicle communication systems of motor vehicles that are equipped with sensor using the respective software.

5. The method as recited in claim 1, wherein the transmitting includes transmitting the updated software of the at least one sensor by the second motor vehicle to the motor vehicle communication system equipped in the first motor vehicle only at previously defined times.

6. The method as recited in claim 1, wherein the transmitting includes transmitting, by the second motor vehicle, the updated software of the at least one sensor in encrypted fashion and/or with a checksum.

7. The method as recited in claim 1, further comprising backing up software located on the at least one sensor before installing the updated software of the at least one sensor on the at least one sensor.

8. The method as recited in claim 1, wherein the installing includes installing the updated software of the at least one sensor on the at least one sensor only when the motor vehicle is at a standstill.

9. The method as recited in claim 1, further comprising transmitting data concerning the sensor from the motor vehicle communication system equipped in the first motor vehicle to the second motor vehicle.

10. The method as recited in claim 9, wherein the transmitting is performed as a function of the data transmitted from the motor vehicle communication system equipped in the first motor vehicle to the second motor vehicle.

11. The method as recited in claim 1, wherein the transmitting is performed with the aid of a push mechanism.

12. A system for updating software of at least one sensor installed in a first motor vehicle, comprising:
 a motor vehicle communication system installed in the first motor vehicle, the motor vehicle communication system being adapted to receive, from a second motor vehicle different from the first motor vehicle, updated software of the at least one sensor and to install the received updated software of the at least one sensor on the at least one sensor.

13. The system as recited in claim 12, further comprising an arrangement for transmitting the updated software of the at least one sensor to the motor vehicle communication system installed in the first motor vehicle only at previously defined times.

14. The system as recited in claim 12, wherein the motor vehicle communication system installed in the first motor vehicle is configured to transmit data concerning the at least one sensor to the second motor vehicle.

15. The system as recited in claim 14, wherein the second vehicle is configured to transmit the updated software of the at least one sensor as a function of the data transmitted from the motor vehicle communication system installed in the first motor vehicle.

16. The system as recited in claim 12, wherein the second vehicle is configured to transmit the updated software of the at least one sensor to the motor vehicle communication system installed in the first motor vehicle with the aid of a push mechanism.

17. The method as recited in claim 1, further comprising:
 prior to the transmitting of the updated software of the at least one sensor, exchanging data between the first motor vehicle and the second motor vehicle.

18. The method as recited in claim 17, wherein the data includes respective motor vehicle type, at least one sensor number, and current installed software version of the at least one sensor.

19. The method as recited in claim 18, further comprising:
 after the exchanging of the data and prior to the transmitting of the updated software of the at least one sensor, detecting by the second vehicle that the second vehicle has an identical sensor as the at least one sensor and has newer software for the identical sensor.

20. The system as recited in claim 12, wherein the second vehicle is configured to transmit the updated software of the at least one software via a car-to-car connection.

* * * * *